(12) United States Patent
Joseph et al.

(10) Patent No.: US 7,563,470 B2
(45) Date of Patent: Jul. 21, 2009

(54) NON-DAIRY WHIPPABLE FOOD PRODUCT

(75) Inventors: John F. Joseph, Tonawanda, NY (US); Andrew G. Fendinger, North Evans, NY (US); Daniel Keitz, Orchard Park, NY (US)

(73) Assignee: Rich Products Corporation, Buffalo, NY (US)

( * ) Notice: Subject to any disclaimer, the term of this patent is extended or adjusted under 35 U.S.C. 154(b) by 697 days.

(21) Appl. No.: 10/805,779

(22) Filed: Mar. 22, 2004

(65) Prior Publication Data

US 2005/0025872 A1 Feb. 3, 2005

Related U.S. Application Data

(60) Provisional application No. 60/456,261, filed on Mar. 20, 2003.

(51) Int. Cl.
*A23D 7/00* (2006.01)
(52) U.S. Cl. ........................ 426/564; 426/572
(58) Field of Classification Search .................. 426/564, 426/601, 572
See application file for complete search history.

(56) References Cited

U.S. PATENT DOCUMENTS

| | | | |
|---|---|---|---|
| 3,843,805 A | 10/1974 | Powell | |
| 3,922,361 A | 11/1975 | Vann | |
| 3,968,267 A | 7/1976 | Ogasa et al. | |
| 4,107,343 A | 8/1978 | Petricca | |
| 4,146,652 A | 3/1979 | Kahn et al. | |
| 4,360,535 A | 11/1982 | Darling et al. | |
| 4,387,109 A | 6/1983 | Kahn et al. | |
| 4,461,777 A | 7/1984 | Murase et al. | |
| 4,609,561 A | 9/1986 | Wade et al. | |
| 4,637,937 A | 1/1987 | Terada et al. | |
| 4,744,992 A | 5/1988 | Mitchell et al. | |
| 4,748,033 A | 5/1988 | Syfert et al. | |
| 4,888,194 A | 12/1989 | Andersen et al. | |
| 4,971,826 A | 11/1990 | Kato et al. | |
| 5,069,924 A | 12/1991 | Baccus, Jr. | |
| 5,077,075 A | 12/1991 | Wade | |
| 5,149,557 A | 9/1992 | Morrison et al. | |
| 5,190,781 A | 3/1993 | Van Heteren et al. | |
| 5,246,725 A | 9/1993 | Fisher et al. | |
| 5,290,581 A | 3/1994 | Campbell et al. | |
| 5,336,514 A | 8/1994 | Jones et al. | |
| 5,352,474 A | 10/1994 | Lammers et al. | |
| 5,366,751 A | 11/1994 | Pordy | |
| 5,472,727 A | 12/1995 | Campbell et al. | |
| 5,478,587 A | 12/1995 | Mingione | |
| 5,609,904 A | 3/1997 | Koh et al. | |
| 5,690,986 A | 11/1997 | Okutomi et al. | |
| 5,759,609 A | 6/1998 | Lynch | |
| 5,980,869 A | 11/1999 | Sanker et al. | |
| 6,117,473 A | 9/2000 | Leshik et al. | |
| 6,139,895 A | 10/2000 | Zablocki et al. | |
| 6,139,896 A | 10/2000 | Daenzer-Alloncle et al. | |
| 6,180,159 B1 | 1/2001 | Villagran et al. | |
| 6,203,841 B1 | 3/2001 | Lynch et al. | |
| 6,228,417 B1 | 5/2001 | Hidaka et al. | |
| 6,468,576 B1 | 10/2002 | Sher et al. | |
| 6,551,646 B1 | 4/2003 | Baker | |
| 6,569,485 B2 | 5/2003 | Hussein | |
| 6,649,207 B2 | 11/2003 | Coote et al. | |
| 6,824,810 B2 | 11/2004 | Sargent et al. | |
| 2002/0197371 A1 | 12/2002 | Lee et al. | |
| 2002/0197376 A1 | 12/2002 | Broz | |
| 2003/0104110 A1 | 6/2003 | Sikking et al. | |

FOREIGN PATENT DOCUMENTS

| | | |
|---|---|---|
| DE | 201 21 027 U1 | 12/2001 |
| EP | 0 268 097 A1 | 5/1988 |
| EP | 0 737 425 A1 | 10/1996 |
| EP | 868 850 A1 | 7/1998 |
| EP | 1 210 880 A1 | 5/2002 |
| GB | 1232640 | 5/1971 |
| GB | 2 014 426 A | 8/1979 |
| GB | 2 027 447 A | 2/1980 |
| GB | 2 130 070 A | 5/1984 |
| JP | 61212273 | 9/1986 |
| JP | 63279752 | 11/1988 |
| WO | WO-94/21138 | 9/1994 |
| WO | WO-96/37120 | 11/1996 |
| WO | WO-97/33813 | 9/1997 |
| WO | WO-97/43913 | 11/1997 |
| WO | WO-02/085130 A1 | 10/2002 |

OTHER PUBLICATIONS

HTTP:HANANPRODUCTS.COM, Tres Leches Traditional Latin Dessert Mix Specification Sheet, Oct. 10, 2002 pp. 1-5.

*Primary Examiner*—Jennifer McNeil
*Assistant Examiner*—Jyoti Chawla
(74) *Attorney, Agent, or Firm*—Hodgson Russ LLP

(57) ABSTRACT

The present invention provides a non-dairy whippable food product which comprises an oil in water emulsion. This product is pourable at refrigeration as well as room temperature making it easily whippable. The product comprises at least 30% triglyceride fats, emulsifiers comprising polysorbate 60 and polysorbate 80, stabilizers and proteins such that the whipped confection has a smooth and non-greasy texture, non-waxy mouth feel and pleasurable organoleptic characteristics.

10 Claims, 6 Drawing Sheets

NON-DAIRY WHIPPABLE FOOD PRODUCT

This application claims priority to U.S. provisional application No. 60/456,261, filed on Mar. 20, 2003, the disclosure of which is incorporated herein by reference.

FIELD OF THE INVENTION

The present invention relates generally to the field of whippable food products and more particularly to a pourable non-dairy whippable food product having superior texture and buttericing like organoleptic properties.

DISCUSSION OF RELATED ART

Whippable food products are widely used to make icings and toppings for cakes, tortes, and fillings for creme pies, donuts, eclairs, creme puffs, parfaits, mousses and the like. In recent years a lot of interest has been generated in non-dairy butter-icings. These whippable food products do not generally contain butter or other dairy products as a major ingredient. The nondairy butter-icings are primarily made with vegetable shortening which are water in oil emulsions. These food products typically are solid at room temperature and whipping is not easy.

U.S. Pat. No. 5,290,581 describes a whippable non-dairy product containing 15-60% fat wherein at least 85% of the fat is liquid oil and the rest is hardened fat. A salt component is disclosed to be essential. Products of the prior art with hardening fats typically have an undesirable waxy mouth feel. The waxy mouth feel is often reduced by reducing the amount of fat.

U.S. Pat. No. 4,107,343 describes a pourable whippable emulsion containing 45 to 60% water, 20-30% fat, 7 to 20% sweetener, 0.5 to 2.5% dispersible protein, 0.1 to 0.75% thickener and 0.75 to 2.5% emulsifier.

U.S. Pat. Nos. 4,146,652 and 4,387,109 describe a whippable oil in water emulsion food product comprising sugar, water and triglyceride fat wherein the sugar to water ratio is between 0.8 to 2 and characterized by a fat content of 2.5 to 30%.

U.S. Pat. No. 6,203,841 describes a whippable food product having a fat content of 30% or less. This product is also an oil-in-water emulsion of a triglyceride fat component wherein at least about 50% or more of the fatty acids are of C14 length or less and in which the fat component is made up of a first fraction having an iodine value of 5 or less and a second fraction of hardening fat.

In general, while the water in oil emulsions of vegetable based buttercream-icings have more desirable appearance and flavor, they often have a waxy mouth-feel. To reduce the waxy-mouth feel and produce a stable product, the non-dairy whippable products of prior art generally used oil in water emulsions of 30% or lower triglyceride fat content with an emphasis on the majority of the fat triglycerides having low iodine value (less than 5 in U.S. Pat. No. 6,203,841). However, none of the whippable products on the market have succeeded in achieving pleasurable butter-like organoleptic properties and superior texture.

Accordingly, to achieve a pleasurable taste and mouth feel in a non-dairy product which is also easy to use, it would be advantageous to have a whippable food product which is pourable at room temperature and which can be whipped into a confection having a smooth and non-greasy texture, a butter-like taste and non-waxy mouth feel.

SUMMARY OF THE INVENTION

The present invention provides a non-dairy whippable food product which is an oil in water emulsion, is easily whippable at refrigeration and room temperatures (i.e., between about 40° F.-80° F.) and can be whipped into a confection having improved organoleptic characteristics. The non-whipped product comprises 30-40% triglyceride fats and a combination of emulsifiers, stabilizers and proteins to provide smooth and non-greasy texture, non-waxy mouth feel and pleasurable organoleptic characteristics. The unwhipped product is pourable at refrigeration and room temperatures and is therefore easily whippable to obtain confections including icings, toppings, fillings and the like. The whipped product is smooth and non-greasy and therefore easy to dispense for making decorations and easy to clean-up.

This invention also provides a method for preparing the non-dairy whippable food product. The method comprises the steps of blending the ingredients, heating up to a temperature to mix the ingredients, cooling, and agitating for a time sufficient for obtaining the whippable product. The whippable product is a liquid and can be stored frozen.

The present invention also provides a method for obtaining a whipped confection from the whippable food product. The product can be whipped by routine methods known in the art to form a non-dairy confection. The whippable product may be whipped with or without additional ingredients such as various forms of sugars or creams.

BRIEF DESCRIPTION OF THE FIGURES

In FIGS. 1-6, the products of the present invention are indicated in bold, the o/w products are indicated as underlined and the w/o Buttercream type products are indicated in plain font.

FIG. 2 is a representation of a sensory map for the flavor of the whipped product. A plot of Factor 1 (sweet, white sweet aroma, hydro and brown/milky, salt taste) versus Factor 2 (vanilla/chalky/sour/bitter taste) is shown for Formula A alone (FA); Formula A plus sugar—1:1-(FA/s (1:1)); Formula A plus sugar—2:1-(FA/s (2:1)); Formula A plus sugar—3:1-(FA/s (3:1)); Formula A plus sugar—4:1 (FA/s (4:1)); Formula A plus sugar mix—2:1-(FA/s mix (2:1)); Dawn Select White But-r-Crème—(DSWB); Brill Vanilla Light n Fluffy—(BVL); Allen White Buttercream Icing Base—(AWB); Brill Extra Smooth (BES); Brill Smooth'n Light—(BSL); Allen Country White Buttercreme Icing—(ACW); Brill Dutch Cupboard—(BDC); Flavorite Instantwhip Vanilla Prewhip—(FRIV); and Vanilla Bettercreme—(VB)

FIG. 3 is another representation of a sensory map for the flavor of the whipped product. A plot of Factor 1 (sweet, white sweet aroma, hydro and brown/milky, salt taste) versus Factor 3 (coconut/pineapple taste) is shown for Formula A alone (FA); Formula A plus sugar—1:1-(FA/s (1:1)); Formula A plus sugar—2:1-(FA/s (2:1)); Formula A plus sugar—3:1-(FA/s (3:1)); Formula A plus sugar—4:1 (FA/s (4:1)); Formula A plus sugar mix—2:1-(FA/s mix (2:1)); Dawn Select White But-r-Creme—(DSWB); Brill Vanilla Light n Fluffy—(BVL); Allen White Buttercream Icing Base—(AWB); Brill Extra Smooth (BES); Brill Smooth'n Light—(BSL); Allen Country White Buttercreme Icing—(ACW); Brill Dutch Cupboard—(BDC); Flavorite Instantwhip Vanilla Prewhip—(FRIV); and Vanilla Bettercreme—(VB)

FIG. 4 is a representation of a sensory map for the texture of the whipped product. A plot of Factor 1 (firmness/oily mouthcoat/rate of dissipation/slippery) versus Factor 2 (moistness) is shown for Formula A alone (FA); Formula A plus sugar—1:1-(FA/s (1:1)); Formula A plus sugar—2:1-(FA/s (2:1)); Formula A plus sugar—3:1-(FA/s (3:1)); Formula A plus sugar—4:1 (FA/s (4:1)); Formula A plus sugar mix—2:1-(FA/s mix (2:1)); Dawn Select White But-r-Crème—(DSWB); Brill Vanilla Light n Fluffy—(BVL); Allen White Buttercream Icing Base—(AWB); Brill Extra Smooth (BES); Brill Smooth'n Light—(BSL); Allen Country White and Buttercreme Icing—(ACW).

FIG. 5 is another representation of a sensory map for the texture of the whipped product. A plot of Factor 1 (firmness/oily mouthcoat/rate of dissipation/slippery) versus Factor 3 (denseness) is shown for Formula A alone (FA); Formula A plus sugar—1:1-(FA/s (1:1)); Formula A plus sugar—2:1-(FA/s (2:1)); Formula A plus sugar—3:1-(FA/s (3:1)); Formula A plus sugar—4:1 (FA/s (4:1)); Formula A plus sugar mix—2:1-(FA/s mix (2:1)); Dawn Select White But-r-Crème—(DSWB); Brill Vanilla Light n Fluffy—(BVL); Allen White Buttercream Icing Base—(AWB); Brill Extra Smooth (BES); Brill Smooth'n Light—(BSL); Allen Country White and Buttercreme Icing—(ACW).

FIG. 6 is yet another representation of a sensory map for the texture of the whipped product. A plot of Factor 2 (moistness) versus Factor 3 (denseness) is shown for Formula A alone (FA); Formula A plus sugar—1:1-(FA/s (1:1)); Formula A plus sugar—2:1-(FA/s (2:1)); Formula A plus sugar—3:1-(FA/s (3:1)); Formula A plus sugar—4:1 (FA/s (4:1)); Formula A plus sugar mix—2:1-(FA/s mix (2:1)); Dawn Select White But-r-Creme—(DSWB); Brill Vanilla Light n Fluffy—(BVL); Allen White Buttercream Icing Base—(AWB); Brill Extra Smooth (BES); Brill Smooth'n Light—(BSL); Allen Country White and Buttercreme Icing—(ACW).

DETAILED DESCRIPTION OF THE INVENTION

Figure 1:
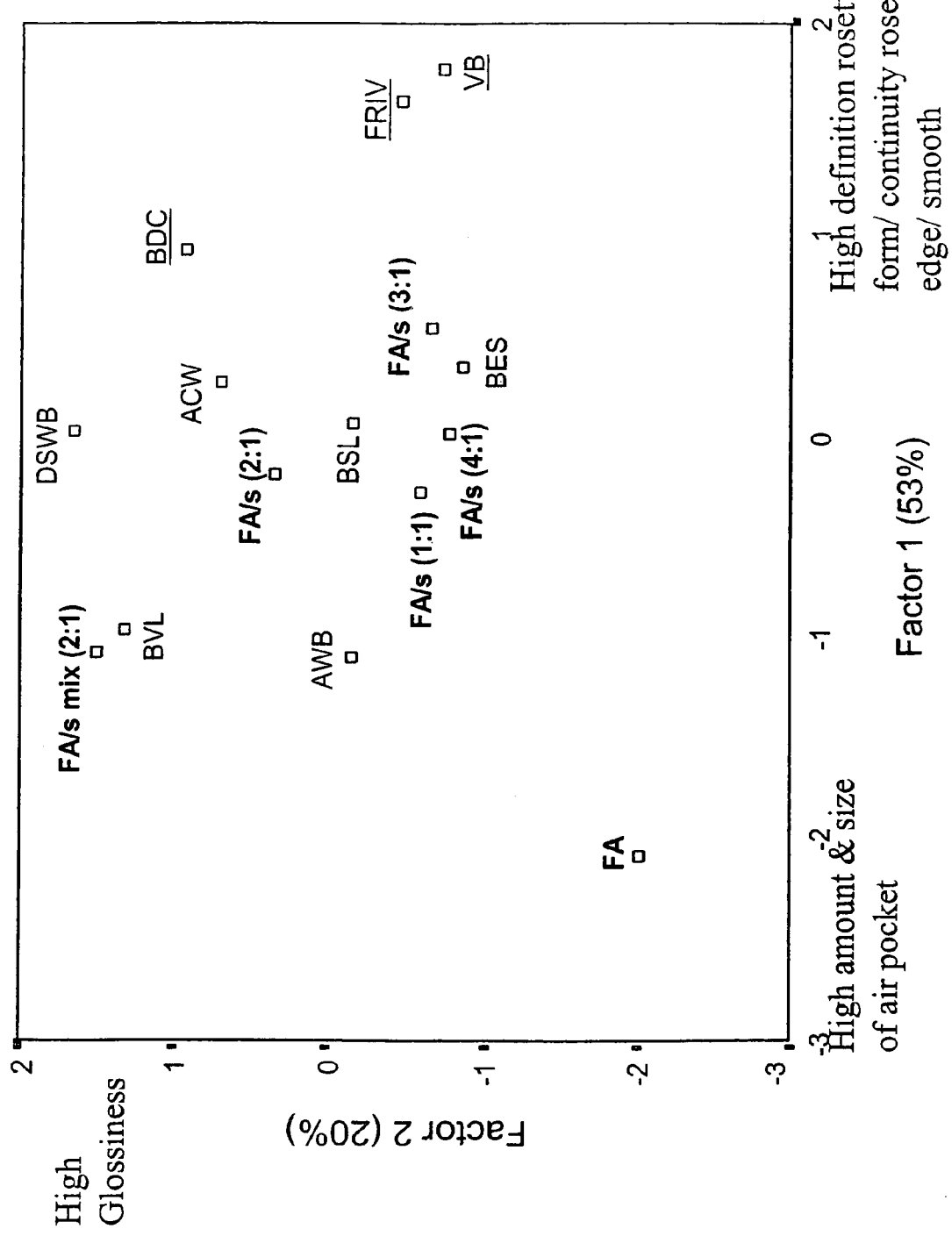
FIG. 1 is a representation of a sensory map for the appearance of the whipped product. A plot of Factor 1 (smoothness of surface, continuity of rosette edge, definition of rosette form, amount of air pockets and size of air pockets) versus Factor 2 (glossiness) is shown for Formula A alone (FA); Formula A plus sugar—1:1-(FA/s (1:1)); Formula A plus sugar—2:1-(FA/s (2:1)); Formula A plus sugar—3:1-(FA/s (3:1)); Formula A plus sugar—4:1 (FA/s (4:1)); Formula A plus sugar mix—2:1-(FA/s mix (2:1)); Dawn Select White But-r-Crème—(DSWB); Brill Vanilla Light n Fluffy—(BVL); Allen White Buttercream Icing Base—(AWB); Brill Extra Smooth (BES); Brill Smooth'n Light—(BSL); Allen Country White Buttercreme Icing—(ACW); Brill Dutch Cupboard—(BDC); Flavorite Instantwhip Vanilla Prewhip—(FRIV); and Vanilla Bettercreme—(VB)

This invention provides a non-dairy whippable food product suitable for preparing improved whipped confections. The food product of the present invention possesses improved organoleptic characteristics compared to other non-dairy products and is easily whippable at refrigeration and room temperatures. The refrigeration and room temperatures are generally in the range of about 40° F.-80° F.

The ingredients of this product are easily available and commonly known to those familiar with the art. This invention provides certain whipped products and confections having desirable texture, organoleptic characteristics and whippable properties. The product comprises 30-40% triglyceride fats. Although not intending to be bound by any particular theory, it is believed that the particular combination of the ingredients including triglyceride fats, emulsifiers, proteins and stabilizers contributes to the substantial performance improvements and other characteristics as described herein.

Representative specific improvements (and combinations of improvements) for whipped food products and confections that are achieved according to the practice of the invention include:

a) unwhipped product is a liquid at refrigeration and ambient temperatures. Accordingly, this product is easily pourable at ambient temperatures and may be used in manufacturing plants which are equipped to process liquids.

b) whipped icings and toppings can be easily produced from the unwhipped liquid product.

c) the product may be whipped with or without additional ingredients such as sugars including powdered sugar, liquid sugar and the like, water and dairy products including cream, milk and the like.

d) the unwhipped product can be stored frozen for over a year or can be stored refrigerated for at least up to 3 months.

e) the whipped product is stable for at least a week.

f) the whipped product performs at least as well as the vegetable oil based buttericings with respect to overrun, shelf-stability, handling and decorating.

g) the whipped product has a non-greasy texture and can be dispensed easily and cleaned up easily.

h) it can be whipped to an overrun of up to about 300%.

i) the density of the whipped product is between about 0.34 to 1.3.

Consequently, at the same percent of solids content, the whipped product of the present invention is lighter than a similar whipped product from traditional buttercream style icings (which are water in oil emulsions and include true butter creams as well as non-dairy vegetable based buttercream icings).

The composition of the present invention comprises 20-40% water, at least 30% fat, emulsifiers, proteins and hydrocolloids. Preferably, the product also has one or more of the following: sugars, including corn syrup, flavors and preservatives, salt and a water to fat ratio of about 0.9 to 2.0. The various ingredients of this product are provided below. When sugars are present in the formula, the concentration of triglyceride fats is between 30-40%.

Fats

The fats useful for the present invention include saturated fats, unsaturated fats as well as saturated fats blended with unsaturated fats. Saturated fats include the hydrogenated oil products of coconut, cottonseed, corn, soybean, peanut, olive etc. Unsaturated fats include palm kernel oil, safflower oil, corn oil, soybean oil, cottonseed oil, sunflower oil and partially hydrogenated fractions thereof. The total range of fats for the present invention is at least 30%, preferably 30% to 40%. In a preferred embodiment, the range is 30% to 34%. It is also preferable to select fats so as to minimize the amount of trans fats. Accordingly, in one embodiment the fat used is partially hydrogenated palm kernel oil.

Emulsifiers

Emulsifiers are used in the present invention between 0.1% to 5%, preferably about from 0.2% to 1.5% as permissible under FDA guidelines. The whippable product comprises polyoxyethylene ethers of sorbitan monostearate (polysorbate 60) and polyoxyethylene ethers of sorbitan monooleate (polysorbate 80). Additional suitable emulsifiers include lecithin, hydroxylated lecithin; mono, di, or polyglycerides of fatty acids, such as stearin and palmitin mono and diglycerides, polyoxyethylene ethers of fatty esters of polyhydric alcohols, or the polyoxyethylene ethers of sorbitan distearate; fatty esters of polyhydric alcohols such as sorbitan monostearate; polyglycerol esters of mono and diglycerides such as hexaglyceryl distearate; mono- and diesters of glycols such as propylene glycol monostearate, and propylene glycol monopalmitate, succinoylated monoglycerides; and the esters of carboxylic acids such as lactic, citric, and tartaric acids with the mono- and diglycerides of fatty acids such as glycerol lacto palmitate and glycerol lacto stearate, and calcium or sodium stearoyl lactylates and all members of the sucrose ester family thereof, all varieties of diacetyltartaric esters of fatty acids, "DATEMS", and the like, and mixtures thereof. Preferably, the product of the present invention comprises polysorbate 60 and polysorbate 80 together at a maximum concentration of 0.2% and more preferably at a concentration of each not exceeding 0.15%.

Stabilizers

The whippable product of the present invention includes one or more hydrophilic colloids. These can be natural such as vegetable, or synthetic gums and may be, for example, carrageenan, guar gum, alginate, xanthan gum and the like or semi-synthetic such as methylcellulose, carboxy-methylcellulose, ethylcellulose, hydroxy-propylmethylcellulose (METHOCEL F-50 HG), and microcrystalline cellulose. Typically, a gum or combination of gums is employed with a sugar, e.g. dextrose, carrier. The amount of these stabilizers for this product is between 0.01 to 0.2%, preferably about 0.1-0.5% as permissible under FDA guidelines.

Starches

Optionally starches can be added to the ingredients either at the time of batching or at the time of whipping. Starches for this invention include starches obtained from potato, arrow root, corn, rice, wheat, waxy maize, sorghum, waxy sorghum and the like. Tapoica starch is also suitable.

Proteins

The whippable product of the present invention includes proteins from 0.1% to 1.0%. Milk proteins such as isolated sodium, potassium or calcium caseinates, protein provided as skim milk, nonfat dry milk, milk protein concentrate, whey protein concentrates, alpha lactalbumin and beta lactoglobulin can be used. The proteins are generally known to assist in the emulsification and stability of the whipped products. Vegetable proteins including but not limited to soy protein, pea protein, wheat protein, cottonseed protein, peanut protein, and corn protein are also useful. Meat proteins derived as soluble proteins from meat processing may also be used according to the practice of the invention.

Sugars

Optionally sugars may be used. The sugars useful for the present invention include, monosaccharides, disaccharides and polysaccharides. The sugars may be comprised of one or more sugars, such as sucrose, fructose, dextrose, and/or sugar syrups, such as high fructose corn syrup, and/or intensive sweeteners, such as aspartame, acetosulfame, alitame, saccharin, cyclamates, and trichloro sucrose. In the event one or more intensive sweeteners are used, bulking agents may be included in the formulation to provide additional solids and provide body to the foam structure. Typical bulking agents are maltodextrin, polydextrose, polyglucose, xylitol, mannitol and sorbitol. For formulation calculations, all of these materials are considered to be included in the sweetener component. For taste purposes and for ease of operation, the sweetener component will normally consist of sucrose or sucrose-fructose combinations Salts Optionally, salt may be used. The salts useful for the present invention is any edible salt that does not interfere with other ingredients or render an undesirable taste. Salts can generally act as buffers and/or as flavorants and/or preservatives. Examples of useful salts are common salt (sodium chloride), sodium or potassium phosphates, citrates, chlorides, sorbates and the like.

Acidulants

Acidulants can be added to impart tartness, control pH or serve as a preservative. Examples of acidulants suitable for the present invention are phosphoric, tartaric, malic, citric, fumaric, and the like. It is preferable to use acidulants so as to maintain a pH range of between 6 to 8.

Other Ingredients

Other ingredients that are useful for the present invention include flavoring agents, colorants, vitamins, minerals milk powder, cream powder etc. Suitable flavoring agents can be employed to impart vanilla, cream, chocolate, coffee, maple, spice, mint, butter, caramel, fruit and other flavors.

When sugar is present in the product, the range of total fats in the whipped product is 30-40%, preferably between 30-34%, the total sugars solids are between 12-42%, preferably between 20-35% and the ratio of water to oil is between 2.0-0.9, preferably between 1.2-0.95. Also, preferably, the concentration of polysorbate 60 and polysorbate 80 together is between 0.01 to 0.2%. In a more preferred embodiment, the concentration of polysorbate 60 and polysorbate 80 each was between 0.01 to 0.1% and even more preferably the concentration of each was about 0.03%. Various flavors can be added to the product with the range depending upon the required flavor profile.

While not intending to be bound by any particular theory, it is considered that the use of the particular combinations of triglyceride fats, proteins, emulsifiers and stabilizers in the product of the present invention accounts for the butter-like taste and non-waxy mouth feel, smooth and non-greasy texture. Thus, to obtain the superior performance of the present invention, it is preferable to have total fats of between 30-40%. In a preferred embodiment, the fats comprise partially hydrogenated palm kernel oil.

In sensory tests, it was observed that the product of the present invention has comparable appearance and flavor to the w/o buttercremes. However, compared to the buttercremes, the present product has less oily and more slippery mouthfeel, and dissipates faster in the mouth producing a pleasurable mouth feel.

The present product is prepared as an oil in water emulsion which contributes to its ease of preparation. With the addition of sugar, the whipped product, changes to a water in oil emulsion which contributes to its improved organoleptic properties.

For preparing the whippable product, the various ingredients are blended, the blended ingredients are heated to a maximum temperature of about 190° F., and mixed using a high shear mixer until there are no significant lumps. The mixture is then homogenized. For example, the mixture can be homogenized using a one or two stage pressures with total pressures of 1000-7000 psi. Homogenization procedures are described in U.S. Pat. No. 6,203,841, incorporated herein by reference. The specific surface area of particles after homogenization is generally in the range of about 0.2 $m^2/g$ to 14.2 $m^2/g$. In one embodiment, the specific surface area is between 1 to 8 $m^2/g$. The homogenized mixture is cooled (for example to about 40-50° F.) and maintained at that temperature under agitation from 0 to 3 weeks, preferably between 4 to 48 hours. Following this, the product is a liquid and is ready for use or packaging. Alternatively, the mixture can be rapidly cooled. The packaged product can be stored frozen or at a refrigeration temperature. The frozen product can be thawed, preferably under refrigerated temperatures and is ready to use.

To obtain a whipped confection, the whippable product of the present invention can be whipped using any mechanical device which can exert a high shear mechanical force such as a paddle, whip, traditional batch mixers, continuous mixers and the like. For batch mixing devices (Hobart, Kitchen Aid, Kenwood etc), the product can be whipped with or without additional ingredients such as sugar, powdered sugar, liquid sugars etc. Adding the sugars would increase the percentage of solids and whipped density resulting in a lower overrun. The sugar can be added to desired taste. Accordingly, the ratio of the product to extra sugar may be greater than 1 or less than 1. In one embodiment, the ratio of the product to extra sugar is 1:0.8. In some embodiments, the ratio is 1:0.5 or 1:0.25. Sugars may be powdered sugars (6, 10, 12× mesh size and the like), granulated sugar, mixtures of powder and granulated sugar, high fructose corn syrup, corn syrup, powdered sugar and water, granulated sugar and water, sugars plus additional starches. Hygroscopic substances such as starch can be used at lower concentrations. The product is easier to whip with a paddle as the amount of sugar increases. Preferably, the product and the extra sugar should be mixed at low speed for a short time (under 1 minute) before whipping at medium speed to the texture that is desirable for a particular use. For use in continuous mixers, the sugar and other additives can be pre-blended before being mixed in the machine. Increasing the amount of sugar will result in high viscosity and excessive backpressure on the system.

As those skilled in the art will recognize, the concentration of the ingredients can be adjusted depending upon the mixing tool and additional ingredients. Typically whipping times range from about 1 minute to about 25 minutes. The density of the whipped product ranges from about 0.34 to about 1.3. The overrun may be up to about 300%. The texture of the whipped product was found to be smoother than the oil in water emulsion products from formulations described in U.S. Pat. Nos. 4,146,652 and 4,387,109.

The unwhipped product can be subjected to various aseptic processing such as thermal treatment to produce a commercially sterile product. Such processes are well known to those skilled in the art and include high temperature short time (HTST), extended shelf life and ultra high temperature (UHT) thermal treatment and packaging.

A variety of whipped confections can be made from the product of this invention. Such confections include fillings, icings, toppings, decorations and the like which can be used for cakes, pies, cookies and the like. The product of the present invention may optionally be combined with other desirable products such as real cream, milk or other dairy products. In one embodiment, 2 parts of the present product were combined with 1 part of real cream to obtain a creamy whipped confection.

The whipped confections of the present invention have a pleasurable buttercream icing like taste and a non-waxy mouth feel. Thus, while the whipped products from the present invention have a pleasurable buttercream like taste, the products do not have many of the disadvantages associated with buttercream products.

In comparative tests with icings prepared with traditional buttercream products (such as Allen Country White (ACW), Brill Smooth and Light (BSL), Brill Vanilla Light n Fluffy (BVL)), the icing of the present invention was found to be easier to use (such as for applying base icing). Typically when base icing prepared from buttercream products is applied on a cake, crumbs from the base are dislodged. Therefore, generally a first thin layer is applied to cover up the crumbs. The first layer is optionally allowed to dry or stiffen and then a second thicker layer is optionally applied. Icings prepared from the present invention are spread easily with very little crumbling of the base. Accordingly, the need to apply the base icing in two layers is avoided resulting in shorter preparation times.

The icing prepared from the present invention is easier to dispense from icing bags for decorating compared to icings made from traditional buttercreams. In addition, the icings produce a homogenous mixture with little or no clumping of hydrophilic regions making it desirable for sharply defined decorations.

If no color is added, the icing is white in color as opposed to the off white color of buttercream icings. Darkening of added colors when exposed to air was observed to be less than observed with traditional buttercreams. When sugar is added to the composition, it also has a smooth visible texture with few, if any aberrations.

With respect to oil bleed—a common problem with the typical buttercream icings, it was observed in comparative tests that while the typical buttercream icings were bleeding into cake boards within hours, the icing of the present invention showed significantly less bleeding. This enables the dessert to have a fresher appearance than with buttercream toppings or icings.

The icings of the present invention are also easier to clean up as compared to those prepared from typical buttercreams. The typical buttercream icings require a significant amount of soap and hot water (>150° F.) to remove all the icing residue and greasy films, particularly from the tips of applicators. The icing of the present invention easily washes away with warm water (140-150° F.) without the need for soap.

The following examples are provided to further illustrate the invention. These examples are provided for illustrative purposes and are not meant to be restrictive in any way.

EXAMPLE 1

This example illustrates the ranges for the various ingredients in the whippable product of the present invention.

TABLE 1

| Ingredient | Range (%) | Preferred Range (%) |
|---|---|---|
| Water | 20-40 | 25-35 |
| Partially Hydrogenated Palm Kernel Oil | 30-40 | 30-35 |
| Sodium Caseinate | 0.1-1.0 | 0.2-0.5 |
| Salt | 0-0.4 | 0.1-0.25 |
| Soy Lecithin | 0-0.3 | 0.06-0.2 |
| Guar Gum | 0.01-0.2 | 0.06-0.12 |
| Sodium Stearoyl Lactylate | 0.01-0.3 | 0.05-0.11 |
| Polysorbate 60 | 0.01-0.15 | 0.02-0.05 |
| Polysorbate 80 | 0.01-0.15 | 0.02-0.05 |
| Sugar | 0-30 | 10-20 |
| Corn Syrup | 0-20 | 5-15 |
| Dextrose | 0-10 | 5-9 |
| High Fructose Corn Syrup | 0-30 | 3-7 |
| Partially Hydrogenated Soybean Oil | 0-5 | 0.6-3 |

In preparing the formulation for the present invention, it was observed that reducing the concentration of guar gum to below 0.01% resulted in a mouth feel that was not desirable. Further, if the concentration of SSL was reduced to below 0.01%, the product was not stable over long term and appeared to be subject to separation. Further, with respect to sugar solids, it is preferable that the total sugar solids be between 12-42% and preferably at least 15%. Partially hydrogenated soybean oil can be used to add texture to the product.

It is believed that both polysorbate 60 and 80 are necessary to achieve the superior performance and organoleptic properties seen herein. In one formulation when only poly 60 was used, the product did not perform well after freeze thaw. In addition, it was also observed that when both the polysorbate 60 and 80 were not present as described herein, the rosette time was reduced from over 1 hour to about 15 minutes.

It was also observed that if the fat was reduced to between 16-28%, with the other ingredients being essentially the same, the product did not whip well. For example, when a 16% fat was used with hydroxypropyl cellulose, it did not whip well; when a 17-28% fat was used with xanthane, the product was gummy and when 16% fat was used with methocel xanthane mixture, the product was cakey.

EXAMPLE 2

This formula (Formula A) had a blend of partially hydrogenated palm kernel and soy oil with total fat being 32%, 32% sugar and corn solids with total solids being 65%, sodium caseinate, soy lecithin, potassium sorbate, guar gum, sodium stearoyl lactylate, sodium benzoate and potassium sorbate. The ingredients are shown in Table 2.

TABLE 2

| Ingredient | % of total formula (Formula A) |
| --- | --- |
| Water | 31.4 |
| Partially Hydrogenated Palm Kernel Oil | 30.4 |
| Sugar | 14.2 |
| Corn Syrup | 9.3 |
| Dextrose | 7 |
| High Fructose Corn Syrup | 4.8 |
| Partially Hydrogenated Soybean Oil | 1.6 |
| Sodium Caseinate | 0.37 |
| Salt | 0.18 |
| Artificial Cream Flavor | 0.15 |
| Soy Lecithin | 0.12 |
| Potassium Sorbate (Preservative) | 0.1 |
| Guar Gum | 0.09 |
| Sodium Stearoyl Lactylate | 0.08 |
| Sodium Benzoate (Preservative) | 0.08 |
| Polysorbate 60 | 0.03 |
| Polysorbate 80 | 0.03 |

The formula was prepared by mixing and heating to 165° F. The homogenization was done with a total of 15000 psi. The cooling was done first at 100° F. and then at 45° F. This produced a product with superior whipping capabilities when whipped with or without sugar. This formula gave 310% over-run without sugar and whipped in 3 mins.

EXAMPLE 3

This example described a comparison of the solid fat content and other parameters between the product of the present invention and traditional buttercremes as well as the oil in water emulsion products such as the ones described in U.S. Pat. Nos. 4,146,652 and 4,387,109. The comparison is shown in Tables 3A and 3B.

TABLE 3A

| Product | Fat | Solids | Calories/8 g Serving | Whip Time (min) |
| --- | --- | --- | --- | --- |
| Present product - Formula A plus sugar (at 76% solids) | 22.1 | 76 | 33.2 | 3 |
| Rich's Butta Icing (cube) | 20.6 | 91.3 | 37.5 | 12 |
| JWA Country white base (cube) | 29 | 95 | 42.0 | 12 |
| JWA Country white RTU | 29 | 95 | 42.0 | N/A[a] |
| Brill butter icing (cube) | 23 | 92 | 38.6 | 12 |
| Present product - Formula A (no sugar added) | 32 | 65 | 33.6 | 3 |
| Frostin Pride ® | 23.5 | 57.7 | 27.9 | 5 |
| Bettercreme ® | 24.7 | 64.7 | 30.6 | 4 |

[a]N/A - indicates non applicable.

TABLE 3B

| Product | Water Activity | Specific Gravity | Bag Time |
| --- | --- | --- | --- |
| Present product - Formula A plus sugar (at 76% solids) | 0.79 | 0.76 | 2 days + |
| Rich's Butta Icing (cube) | .8 | 0.85 | 2 days + |
| JWA Country white base (cube) | 0.76 | 0.86 | 2 days + |
| JWA Country white RTU | 0.76 | 0.86 | 2 days + |
| Brill butter icing (cube) | 0.751 | 0.88 | 2 days + |
| Present product - Formula A (no sugar added) | 0.9 | 0.43 | 1 hr |
| Frostin Pride ® (o/w emulsion) | 0.91 | 0.37 | 1 hr |
| Bettercreme ® (o/w emulsion) | 0.875 | 0.42 | 1 hr |

Thus, the present product can be whipped up in a time that is more comparable to the oil in water emulsion products but can be dispensed for decorations from a bag (also known as the rosette time or bag time) for a time which is more comparable to the water in oil emulsions (buttercreams).

EXAMPLE 4

This formula has a blend of partially hydrogenated palm kernel and coconut oils with total fat being 30%, 34% sugar and corn solids with total solids being 67%, soy lecithin, potassium sorbate, sodium caseinate, xanthan, METHOCELL and POLYALDO. The ingredients and their respective concentrations are shown in Table 4.

TABLE 4

| Description | Percentage |
| --- | --- |
| Partially Hydrogenated Palm Kernel Oil | 24.0 |
| Coconut oil | 6.0 |
| Lecithin | 0.1 |
| Potassium Sorbate | 0.1 |
| sodium caseinate | 1.24 |
| Sugar (extrafine granulated) | 0.16 |
| Xanthan Gum | 0.04 |
| flavor | 0.1 |
| METHOCEL E5 PREM | 0.42 |
| POLYALDO HGDS K | 0.26 |
| Water | 20.2 |
| High Fructose Corn Syrup | 40.23 |
| Corn Syrup | 6.00 |
| salt (regular) | 0.14 |
| Polysorbate 80 | 0.01 |
| Polysorbate 60 | 0.14 |

TABLE 4-continued

| Description | Percentage |
| --- | --- |
| Pollaldo | 0.1 |
| FLVR VAN ART 143.1 | 0.5 |
| | 100 |

The formula was prepared by mixing and heating to 165° F. The homogenization was done in two stages with a total of 3000 psi. The cooling was done first at 100° F. and then at 45° F.

This produced a product with superior whipping capabilities when whipped with or without sugar. This formula gave 267% over-run whipped without sugar and whipped in 8 mins.

EXAMPLE 5

The formula in Example 2 (600 grams of the liquid) was mixed with 100 grams of powdered sugar (with a grind of 10×) and gave a product of approximately 28% fat and 67% solids with an over-run of 170% with good stability.

EXAMPLE 6

The formula in Example 2 (600 grams of the liquid) was mixed with 300 grams of powdered sugar (with a grind of 10×). This resulted in a whipped product of approximately 22% fat and 76% solids with an over-run of 140% with good stability. This formulation was tested as pre-made decorations, buttermints, used on cookies, pies, cheesecakes, cupcakes, cakes, and the like. In comparative tests this formulation performed at least as well as the product from traditional buttercreams in terms of overrun, shelf stability, handling and decorating.

EXAMPLE 7

The formula in Example 2 (600 grams of the liquid) was mixed with 950 grams of powdered sugar (with a grind of 10×) gave a product of approximately 13% fat and 86% solids with good stability.

EXAMPLE 8

This example describes the organoleptic properties of the product of the present invention. In this example, the organoleptic properties of several embodiments of the present product were compared with those of some commercially available w/o buttercreams or o/w products.

The samples tested were
Formula A alone—(FA)
Formula A plus sugar mix (2:1)—the sugar mix contained 450 g of powdered sugar and 50 g granulated sugar-(FA/s mix (2:1))
Formula A plus sugar (1:1)-(FA/s (1:1))
Formula A plus sugar (2:1)-(FA/s (2:1))
Formula A plus sugar (3:1)-(FA/s (3:1)
Formula A plus sugar (4:1)-(FA/s (4:1))
The above formulations were compared with the following commercially available vegetable based buttercreams (w/o emulsions) products:
Dawn Select White But-r-Crème (RTU)—(DSWB)
Brill Vanilla Light n Fluffy—(BVL)
Allen White Buttercream Icing Base—(AWB)
Brill Extra Smooth (RTU)—(BES)
Brill Smooth'n Light—(BSL)
Allen Country White Buttercreme Icing (RTU)—(ACW)
The following commercially available o/w emulsions were also used
Brill Dutch Cupboard—(BDC)
Flavorite Instantwhip Vanilla Prewhip—(FRIV)
Vanilla Bettercreme®—(VB).

All commercially available products were used according to the manufacturer's instructions. "RTU" indicates the product was ready to use.

The appearance attributes analyzed were: color, glossiness, smoothness of surface, continuity of rosette edge, definition of rosette form, amount of air pockets and size of air pockets. The flavor attributes tested were: white sweet aromatic, chalky/dusty, hydrogenated oil/shortening, brown/caramelized, coconut/fruity, pineapple, vinyl, metallic, toasted, cultured/soured, cardboard, lime impression, egg white (impression), salt, sweet, sour, bitter and numbing. The texture attributes tested were: moistness, oily lips, firmness, denseness, grittiness, slipperiness, rate of dissipation and oily mouthcoat. The sensory tests were conducted by $21^{st}$ Sensory, (Bartlesville, Okla.) according to well established methods (ASTM Manual 26, Sensory Testing Methods, $2^{nd}$ Ed., E. Chambers IV editor, 1996; ASTM Manual on Descriptive Analysis Testing for Sensory Evaluation, R. Hootman, Editor, 1996. The appearance, flavor and texture data were averaged across ten assessors to obtain an average sensory profile for each sample. The average profiles were submitted to separate factor analysis (ANOVA) for appearance, flavor and texture to identify the dimensions of sensory variability that best summarize the differences among the samples. The results were used to produce charts (or maps) which indicate the location of the samples on each sensory dimension.

For sensory maps on Appearance, five attributes were combined as one factor because of similar r values. The five attributes (lumped as Factor 1) were: smoothness of surface, continuity of rosette edge, definition of rosette form, amount of air pockets and size of air pockets. Another attribute, glossiness, was termed as Factor 2. These attributes contributed to 73% of variability of the original Appearance attributes. Factor 1 was then plotted versus Factor 2 (glossiness). The position of various products is shown in FIG. 1. The products of the present invention, alone or with various ratios of sugar (indicated in bold), are similarly placed on this map as the w/o buttercremes (DSWB, BVL, ACW, AWB, BSL and BES). The o/w emulsions shown are BDC, FRIV and VB (indicated as underlined).

Figure 2:
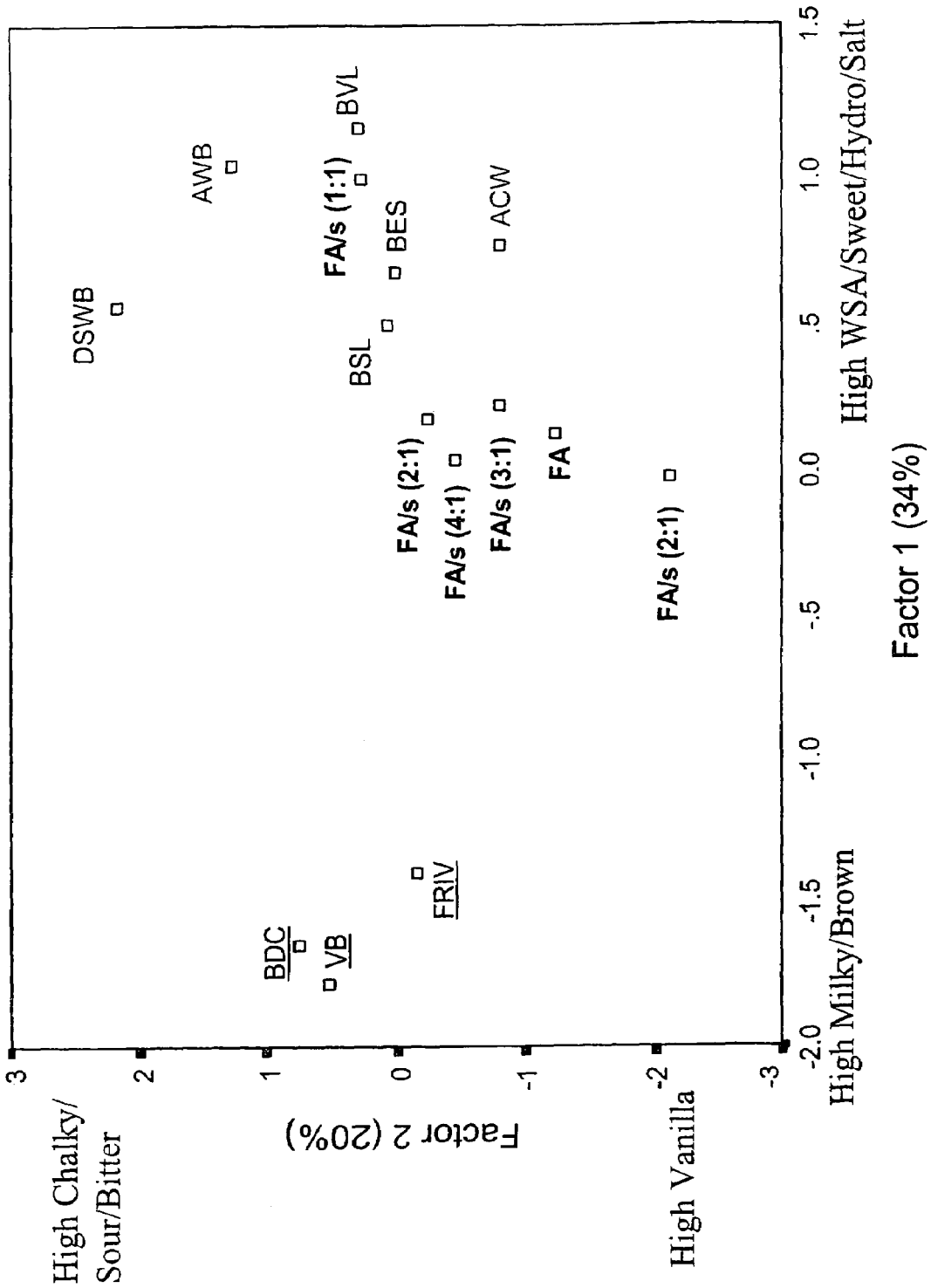
Figure 3:
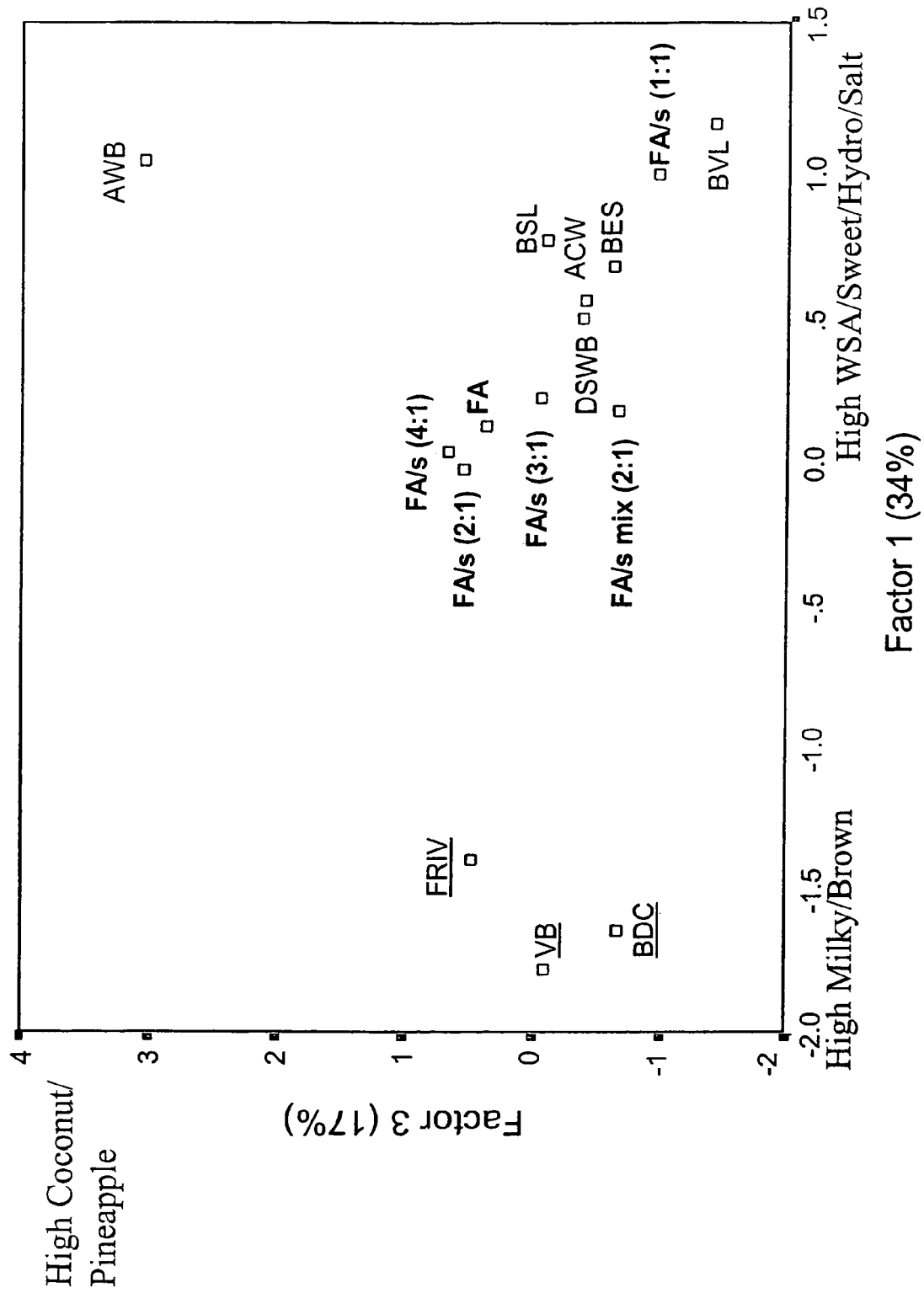

For sensory maps on Flavor, attributes were separated into three factors based on similar r values. Factor 1 included "sweet, white sweet aroma (WSA), hydro, and brown/milky/salt taste. Factor 2 included vanilla/chalky/sour/bitter taste and Factor 3 included coconut/pineapple taste. These dimensions contributed to 71% of sensory variability of the original Flavor attributes. The positions of the various products are shown on a plot of Factor 1 versus Factor 2. As shown in FIG. 2, the product of the present invention was similarly placed on this plot as the vegetable oil based buttercremes (DSWB, BVL, ACW, AWB, BSL and BES) while the oil in water emulsions (BDC, VB and FRIV) were placed more toward the milky brown flavor. When Factor 1 was plotted versus Factor 3 (FIG. 3), again the product of the present invention either alone or with different concentrations of sugar, was placed similar to the buttercremes (DSWB, BVL, ACW, AWB, BSL and BES) while the oil in water emulsions (BDC, VB and FRIV) were placed more toward high milky/brown flavor.

Figure 4:
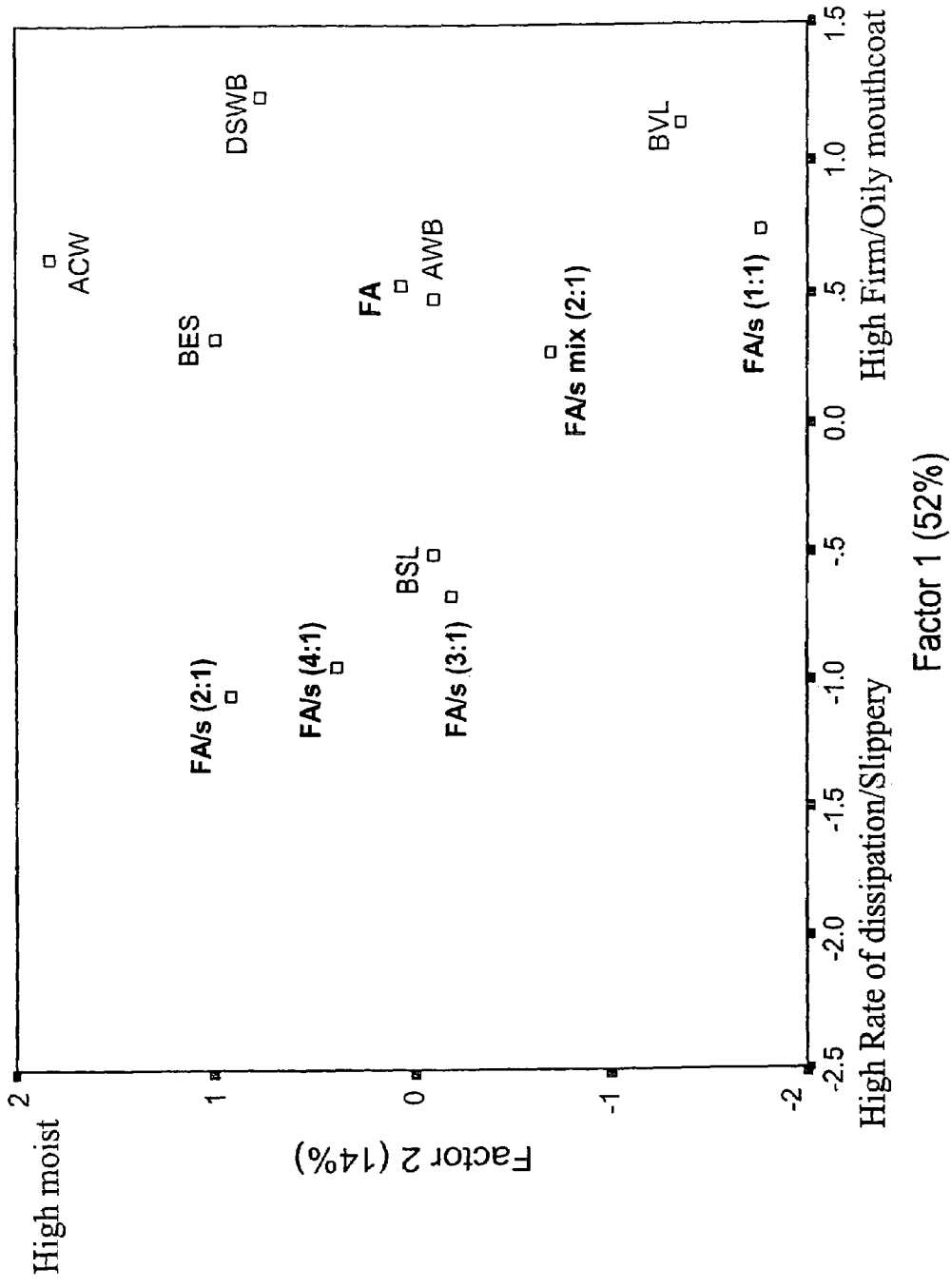
Figure 5:
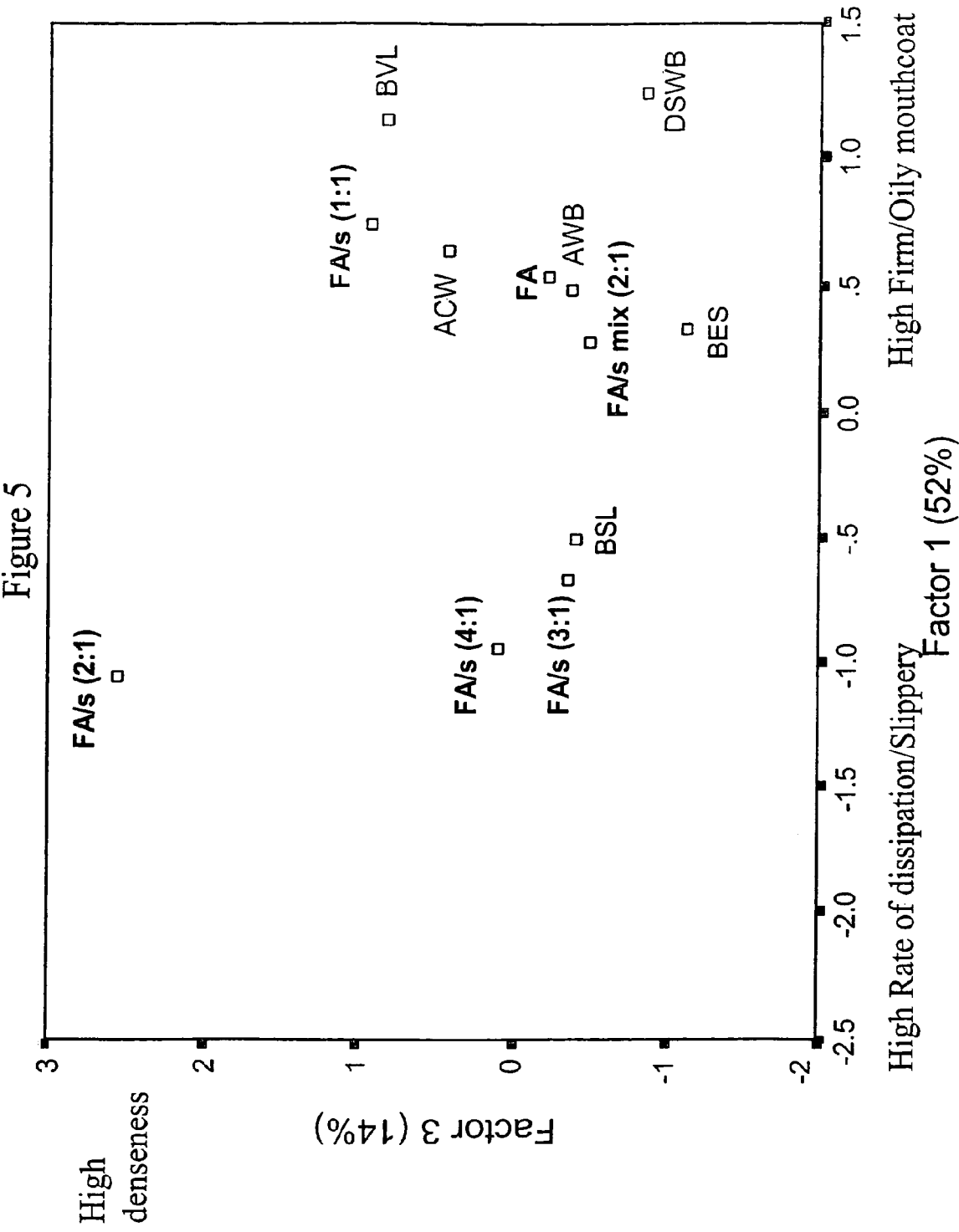
Figure 6:
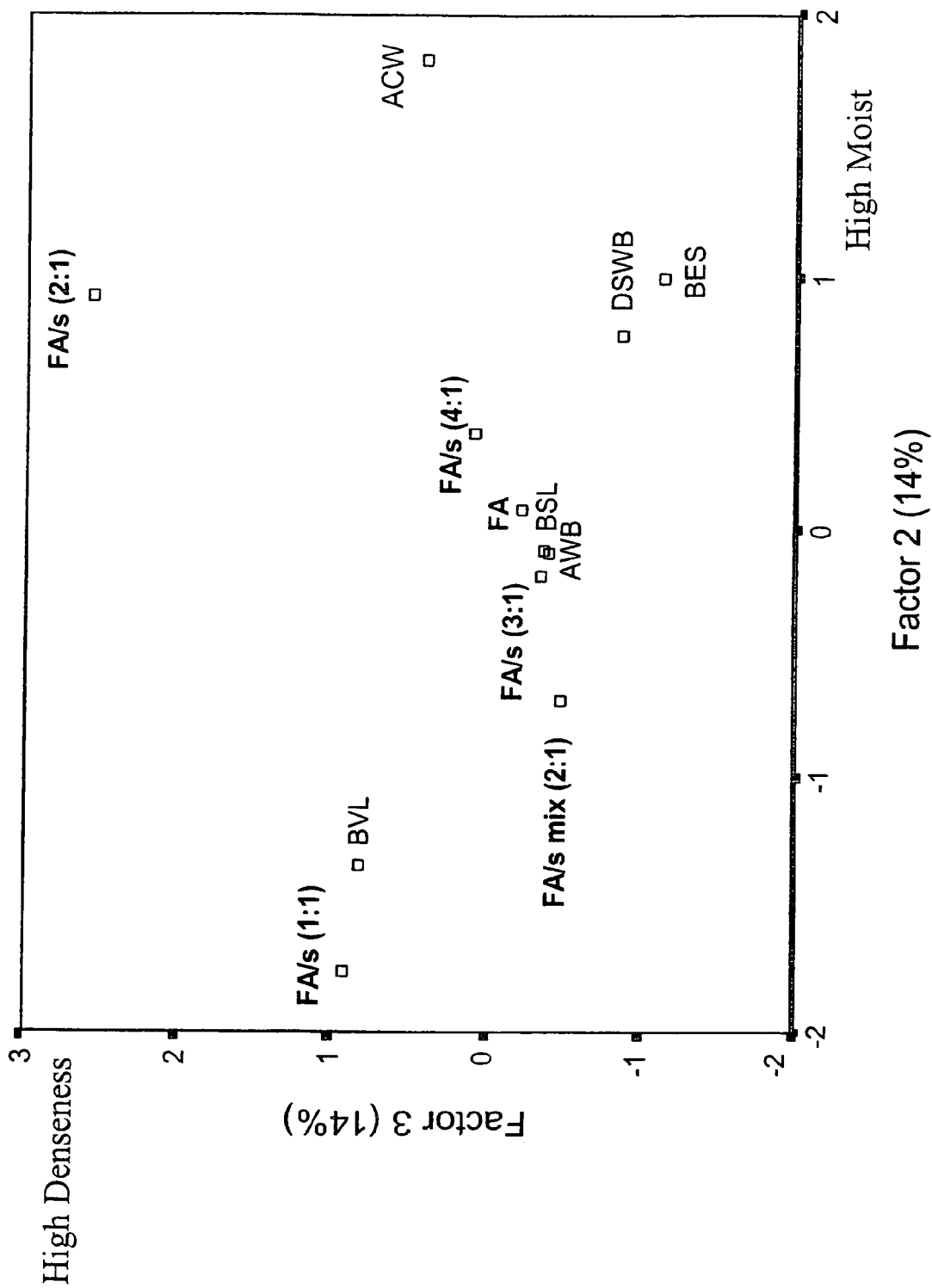

For sensory maps on Texture attributes, attributes were again separated into three factors. Factor 1 included "firmness/oily mouthcoat/rate of dissipation/slippery. Factor 2 was moistness and Factor 3 was denseness. These dimensions contributed to 80% of sensory variability of the original flavor attributes. The positions of the various products are shown on a plot of Factor 1 versus Factor 2. As shown in FIG. 4, the product of the present invention when mixed with sugar had a more slippery mouth feel and dissipated faster in the mouth and had less mouthcoat than some of the buttercremes. On a plot of Factor 3 and Factor 1 (FIG. 5), again the product of the present invention when mixed with sugar (2:1, 3:1 or 4:1), had a more slippery mouthfeel and less mouthcoat as compared to the buttercremes. When Factor 3 was plotted versus Factor 2 (FIG. 6), the formulations of the present product were ranked to be generally less moist than the buttercremes.

It is believed that all of the above attributes contribute to the superior organoleptic and other properties of the products of the present invention.

Various examples have been presented herein for the purpose of illustration. Routine modifications to these formulas are within the purview of those skilled in the art and are intended to be within the scope of the present disclosure.

What is claimed is:

1. A whippable food product which is pourable at refrigeration and room temperatures comprising by wt % about 30-40% triglyceride fats, emulsifiers between 0.15 to 0.41% comprising 0.02 to 0.05% polysorbate 60, 0.02 to 0.05% polysorbate 80, 0.06 to 0.2% lecithin, and 0.05 to 0.11% sodium; stearoyl lactylate, one or more hydrophilic colloids and 0.2 to 0.5% proteins, wherein the whipped confection has a smooth, non-greasy texture, is free of waxy mouth feel and has a butter-like taste, and wherein the whipped confection behaves as an oil-in-water emulsion, but if whipped with added sugar, behaves as a water-in-oil emulsion.

2. The whippable food product of claim 1, wherein the concentration of triglyceride fats is between 30 to 34%.

3. The whippable food product of claim 1, wherein the concentration of triglyceride fats is about 32%.

4. The whippable food product of claim 1, wherein the triglyceride fats comprise partially hydrogenated palm kernel oil.

5. The whippable food product of claim 4, wherein the triglyceride fats further comprise coconut oil.

6. The whippable food product of claim 4, wherein the triglyceride fats further comprise partially hydrogenated soybean oil.

7. The whippable food product of claim 1, wherein the concentration of each of polysorbate 60 and polysorbate 80 is about 0.03%.

8. The whippable food product of claim 1, wherein the hydrophilic colloids are between 0.01 to 0.2%.

9. The whippable food product of claim 1, wherein the hydrophilic colloids are between 0.06 to 0.12%.

10. The whippable food product of claim 1, further comprising sugar.

* * * * *